United States Patent [19]

Konkle

[11] Patent Number: 4,530,136
[45] Date of Patent: Jul. 23, 1985

[54] BAYONET-TYPE LATCH MECHANISM WITH POSITIVE LOCKING FUNCTION

[75] Inventor: Douglas R. Konkle, Pinnacle, N.C.
[73] Assignee: Sunline Hardware, Inc., King, N.C.
[21] Appl. No.: 422,738
[22] Filed: Sep. 24, 1982
[51] Int. Cl.³ .............................................. A44B 21/00
[52] U.S. Cl. ...................................... 24/608; 24/453; 24/573; 403/381
[58] Field of Search ................. 24/606, 607, 608, 610, 24/614, 617, 620, 623, 625, 604, 605, 453, 573; 411/40, 41, 508, 509, 510; 403/381, 289, 290, 354, 316

[56] References Cited

U.S. PATENT DOCUMENTS

| | | | |
|---|---|---|---|
| 2,824,315 | 2/1958 | McKenny | 24/608 X |
| 3,313,510 | 4/1967 | Mudano | 248/244 |
| 3,414,253 | 12/1968 | Mewse | 24/453 X |
| 3,568,263 | 3/1971 | Meehan | 24/453 X |
| 3,915,100 | 10/1975 | Sullivan | 108/64 |
| 3,919,867 | 11/1975 | Lipschutz | 403/328 X |
| 4,025,216 | 5/1977 | Hives | 403/381 |
| 4,233,881 | 11/1980 | Carrier | 24/573 X |
| 4,266,882 | 5/1981 | Wilhelmi | 403/14 |

Primary Examiner—William E. Lyddane
Assistant Examiner—Peter A. Aschenbrenner
Attorney, Agent, or Firm—John S. Fosse

[57] ABSTRACT

A selectively lockable latch to be used, for example, in fastening two furniture parts or the like in temporary alignment comprises a bolt member, a strike box unit and a lock rod. The bolt member includes a projecting nose and a channel which bisects the nose to define a slideway for the lock rod and to divide the nose into a pair of flexible arms. A snap-latch arrangement acts latchably between the bolt member and the strike box unit and includes selectively interengagable cam surface elements. The lock rod is slidably received in the nose channel to be selectively disposed between the flexible nose arms in one position to prevent covergence of the arms and to lock the bolt member in the strike box unit, the lock rod being selectively withdrawable from between the flexible nose arms into a second longitudinal position whereby to permit convergence of the arms and release of the bolt member from the strike box unit.

5 Claims, 4 Drawing Figures

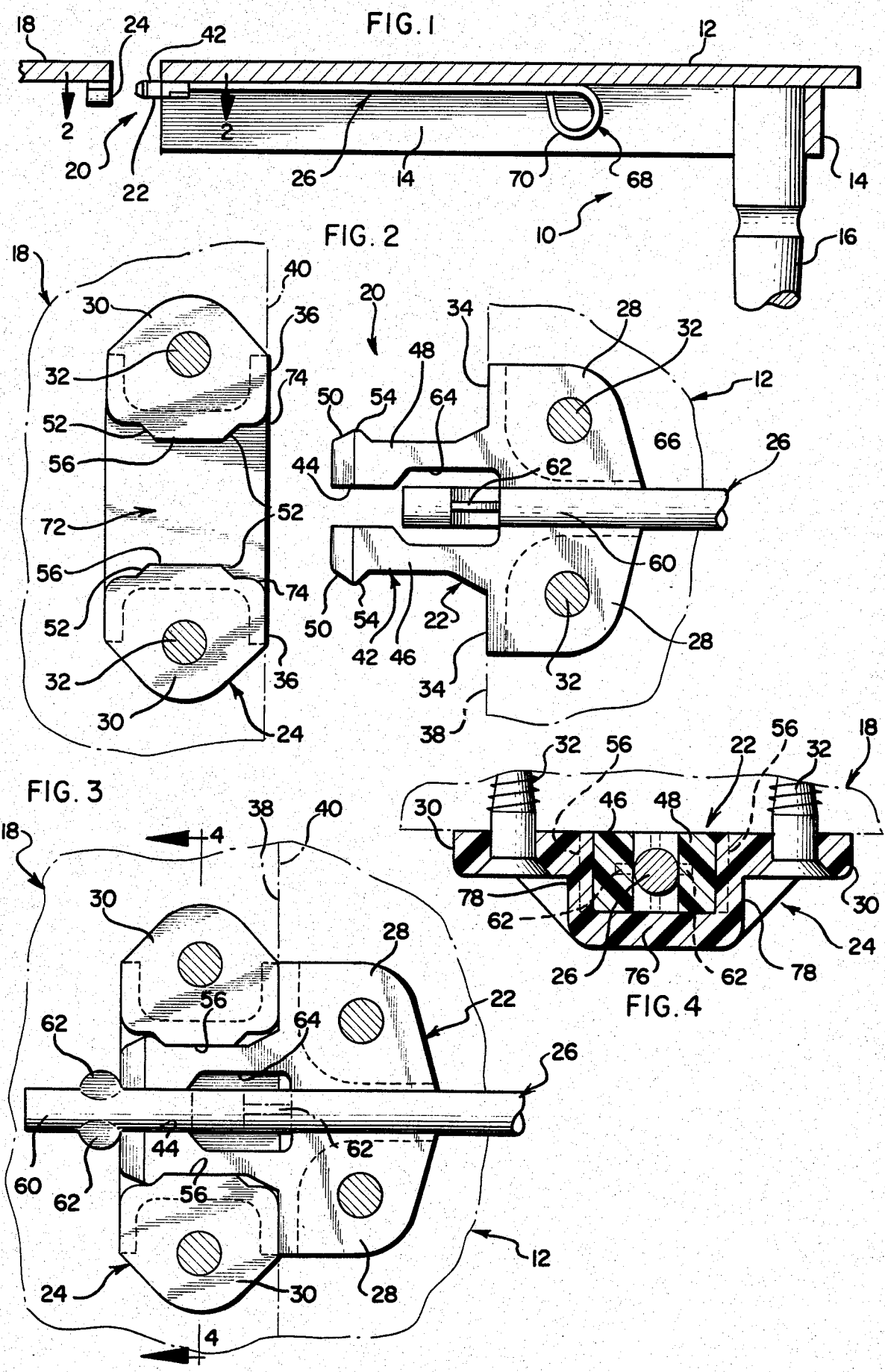

BAYONET-TYPE LATCH MECHANISM WITH POSITIVE LOCKING FUNCTION

FIELD OF THE INVENTION

This invention relates in general to furniture hardware and more specifically to hardware devices which accomplish the dual functions of temporarily aligning and latching two furniture parts, such as the body leaves and the demountable auxiliary leaves of an extension table unit.

BACKGROUND OF THE INVENTION

A longstanding problem in the use of extension tables resides in the provision of a uniformly flat and continuous table surface free of gaps when the unit is assembled with its full complement of extension leaves; and numerous forms of table leaf leveling and alignment devices have been proposed in the past with varying degrees of success. In addition, provisions have been made in some of these devices for latching the assembled leaves together once they have been aligned. However, the table leaf leveler and latch devices of the prior art have failed to provide a positive latching function with quick-release capabilities.

SUMMARY OF THE INVENTION

The present invention overcomes the limitations of the prior art by incorporating a slidably operable lock rod in a bolt-and-strike-box type of latch arrangement. In one relative position, the operator tip of the lock rod prevents convergence of the arms of the bifurcated bolt in order to lock the bolt in the strike box. In a different relative longitudinal position, the lock rod operator tip is withdrawn from between the bolt arms to permit their convergence for egress of the bolt from the strike box.

Accordingly, a general object of the present invention is to provide a new and improved alignment-and-latch device for use with furniture parts and the like.

A further object of the invention is to provide an alignment-and-latch device which incorporates a manually operable, quick-acting lock rod for selectively and positively locking and releasing separate bolt and strike box components.

These and other objects and other features of the invention will become more apparent from a consideration of the following descriptions.

BRIEF DESCRIPTION OF THE DRAWING

In order that the principles of the invention may be readily understood, a single embodiment thereof applied to an extension table unit, but to which the application is not to be restricted, is shown in the accompanying drawing wherein:

FIG. 1 is a central cross-sectional view of an extension table unit which incorporates lockable latch means constructed in compliance with the present invention;

FIG. 2 is an enlarged plan view taken substantially along the line 2—2 of FIG. 1 and showing details of the lockable latch means in its separated condition;

FIG. 3 is a view similar to the showing of FIG. 2 but illustrating the latch means in its interlocked condition; and FIG. 4 is a central sectional view taken substantially along the line 4—4 of FIG. 3.

DETAILED DESCRIPTION OF THE INVENTION

Referring now in details to the drawing and giving first attention to FIG. 1, an extension table arrangement indicated generally by the reference numeral 10 is seen to include a permanent body leaf 12, a peripherally pendant skirt 14, and one of the several supporting legs 16. The extension table arrangement 10 further includes a demountable auxiliary leaf 18; and the leaves 12 and 18 are selectively assembled in proper alignment by a leveler-and-latch device indicated generally by the numeral 20.

Turning to FIG. 2, the leveler-and-latch device 20 is constructed in compliance with the present invention to comprise a bolt member 22, a strike box unit 24 and a lock rod 26. The bolt member 22 and the strike box unit 24 are conveniently fabricated in an injection molding operation from a suitable engineering plastics material, such as, for example, polyamide or polycarbonate resins; and both the bolt member and the strike box unit are fashioned with laterally-spaced mounting flanges, respectively identified by the reference numerals 28 and 30. These mounting flanges are suitably apertured to pass woodscrews 32 into fastening engagement with the undersurface regions of the body leaf 12 and the demountable auxiliary leaf 18. Furthermore, the bolt member 22 and the strike box unit 24 are provided with respective pairs of stop shoulders 34 and 36 which are used in aligning these parts with edge surfaces 38 and 40 of the body leaf 12 and the auxiliary leaf 18 respectively. For facility in handling and assembly, the strike box unit 24 is usefully fabricated as a symmetrical part.

In compliance with the present invention, the bolt member 22 includes a projecting nose element 42 that is bifurcated by means of a channel 44 which divides the projecting nose element into a pair of laterally flexible arms 46 and 48. In addition, the channel 44 defines part of an anti-friction slideway for the lock rod 26.

Advantageously, snap-latch means are included for latchably acting between the bolt member 22 and the strike box unit 24; and these snap-latch means comprise first cam surface elements 50 provided on the bolt member 22 and cooperating second cam surface elements 52 situated on the strike box unit 24. Forcible interengagement of these cam surface elements in the direction of assembly of the bolt member and the strike box unit causes convergence of the flexible arms 46 and 48, in the absence of the lock rod 26 residing in the channel 44. The cam surfaces 50 terminate in cam lobes 54 which ride on dwell surfaces 56 of the strike box until the remote cam surfaces 52 are reached to allow the resilience of the arms 46 and 48 to restore the nose element 42 thereby latching the bolt member to the strike box unit.

The lock rod 26 includes an operator tip portion 60 which is arranged to be selectively received in the nose channel 44 between the flexible arms 46 and 48 in order to prevent convergence of these arms when the bolt nose element is advanced into the strike box whereby to lock the bolt member in place. This operator tip portion 60 is also arranged to be withdrawn from between flexible nose arms 46 and 48 into a second longitudinal position to permit convergence of the nose arms and release of the bolt member from the strike box unit 24. The lock rod 26 further includes radially protuberant ears 62 which are diametrically disposed and which act as position stops. In order to accommodate longitudinal and rotational repositioning of the ears 62, the bolt member 22 is fabricated with a laterally enlarged, elongate cavity 64 which is axially aligned with the nose channel 44. The body of bolt member 22 also comprises an extension channel or slideway 66 aligned with the channel 44 for insuring proper longitudinal guidance of the movements of the lock rod 26.

The lock rod 26 itself is additionally provided with a handle portion 68 spaced from the operator tip portion; and for convenience in manipulation, the handle portion 68 includes a radially offset, finger-engagable loop 70 which is best seen in FIG. 1.

The dwell surfaces 56 of the strike box unit are spaced apart to define a bolt-receiving way 72 therebetween; the way 72 is fashioned with a mouth which opens toward the bolt nose element 42 and which is defined by a pair of spaced, outwardly diverging lips 74. The cam surface elements 50 of the bolt nose element comprise a tapered tip; and this bolt nose tip cooperates with the diverging lips 74 in leading the bolt nose element 42 into invaginated engagement with the way 72 of the strike box unit for aligning the respective table leaves 12 and 18.

In order to permanently interconnect the flanges 30 of the strike box unit, a vertically offset plate 76 is connected across these flanges by a pair of pendant sidewall elements 78, as is shown in FIG. 4.

Having thus described one construction of the invention, it will be valuable now to state how the illustrated embodiment operates.

Assuming that the bolt member 22, the strike box unit 24 and the lock rod 26 have been assembled in the extension table arrangement 10 as shown in FIG. 1 and assuming further that the leaves 12 and 18 are spaced apart and that it is desired to latch them into abutting relationship, the lock rod 26 will be withdrawn from the channel 44; and appropriate clearance in this regard may be tactily sensed by the ears 62 bottoming against the end wall of cavity 64 as is shown in FIG. 2. The leaves 12 and 18 will then be manually converged until the cam surfaces 50 of the bolt nose element 42 engage the lips 74 and ultimately the cooperating, adjacent cam surface elements 52. Further advancing movement at this point results in convergence of the flexible bolt nose arms 46 and 48 and engagement between the cam lobes 54 and the dwell surfaces 56. Additional closing action on the leaves 12 and 18 will urge the respective leaf edges 38 and 40 into contact with each other at which juncture the cam lobes 54 will snap over the remote cam surface elements 52 to lock the bolt member 22 to the strike box unit 24.

In order to lock the respective parts in this latched engagement, it will be necessary to rotate the rod 26 ninety degrees in order to dispose the ears 62 in the dotted line position shown in FIG. 3 whereupon the lock rod will be advanced into and preferably through the channel 44 and thereafter rotated back ninety degrees so that the ears 62, when clear of the end of the bolt nose element 42, are disposed in the position shown in solid lines in FIG. 3. The presence of lock rod 26 in the channel 44 thus prevents convergence of the bolt nose arms 46 and 48 and locks the parts positively together. In order to back the bolt member 22 out of the strike box unit 24, mere reverse rotation and withdrawal of the lock rod is necessary. As will be appreciated, the present invention thus provides a positive latching function with quick-release capability.

While a particular embodiment of the invention has been shown and described, it should be understood, of course, that the invention is not limited thereto since many modifications may be made and since the principles of the present invention may be readily applied to numerous latching functions. It is, therefore, contemplated to cover by the present application all such modifications and variations as fall within the spirit and scope of the appended claims.

The invention is claimed as follows:

1. A selectively lockable latch to be used in fastening two furniture parts or the like in temporary alignment, comprising: bolt means having a projecting nose and a channel bisecting said nose to define a slideway for a lock rod and to divide said nose into a pair of laterally flexible arms; strike box means comprising confronting surface means for releasibly latchably receiving said bolt nose therebetween; snap-latch means including first and second interengagable cam means disposed respectively on said bolt nose and said surface means for latchably acting between said bolt means and said strike box means; and a lock rod longitudinally slidably received in said nose channel, including end means for being disposed between said laterally flexible nose arms in a first longitudinal and rotational position to prevent convergence of said arms whereby to lock said bolt means to said strike box means and to be withdrawn from between said flexible nose arms in a second longitudinal and rotational position whereby to permit convergence of said arms and release of said bolt means from said strike box means, said lock rod including radial protuberance means for acting as a position stop when said lock rod is in said first longitudinal and rotational position and said channel being dimensioned to permit rotation of said lock rod into said second rotational position and withdrawal from said channel into said second longitudinal position, said bolt means further including elongate cavity means providing working space for said protuberance means, said cavity means being dimensioned to admit said end means in said second longitudinal position freeing said nose arms for convergence and for resultant withdrawal of said bolt means from latching engagement with said strike box means.

2. A selectively lockable latch according to claim 1 wherein said bolt means and said strike box means include mounting means for use in attachment to respective furniture parts or the like.

3. A selectively lockable latch according to claim 1 wherein said lock rod further includes a handle portion spaced apart from said end means.

4. A selectively lockable latch according to claim 3 wherein said handle portion includes a radially offset, finger-engagable loop.

5. A selectively lockable latch according to claim 1 wherein said confronting surface means define a bolt-receiving channel therebetween, wherein said bolt-receiving channel includes surfaces defining a mouth with outwardly diverging lips and wherein said bolt nose includes a tapered tip to cooperate with said diverging lips in leading said bolt means into engagement with said strike box means for aligning the respective furniture parts or the like that are attached thereto.

* * * * *